US005469262A

United States Patent [19]
Keen et al.

[11] Patent Number: 5,469,262
[45] Date of Patent: Nov. 21, 1995

[54] DIMENSION-MEASURING APPARATUS

[75] Inventors: Harry J. Keen, St. Johnsbury; Mike Dunne, Peacham, both of Vt.

[73] Assignee: Fairbanks Inc., Kansas City, Mo.

[21] Appl. No.: 273,809

[22] Filed: Jul. 12, 1994

[51] Int. Cl.[6] .................................................. G01B 11/04
[52] U.S. Cl. ............................................ 356/386; 356/380
[58] Field of Search .................................. 356/380, 386, 356/387; 250/560; 348/199

[56] References Cited

U.S. PATENT DOCUMENTS

| | | |
|---|---|---|
| 2,350,820 | 6/1944 | Rettinger . |
| 3,619,626 | 11/1971 | Rudolph ................................. 356/387 |
| 3,620,629 | 11/1971 | Whittington .......................... 356/387 |
| 3,658,428 | 4/1972 | Voigtlaender-Tetxner . |
| 3,765,774 | 10/1973 | Petrohilos . |
| 3,806,253 | 4/1974 | Denton . |
| 3,943,361 | 3/1976 | Miller ................................... 250/560 |
| 3,992,111 | 11/1976 | Roulier et al. ....................... 356/431 |
| 4,192,613 | 3/1980 | Hammar ............................... 356/386 |
| 4,773,029 | 9/1988 | Claesson et al. .................... 356/386 |
| 5,130,532 | 7/1992 | Clemens . |
| 5,198,661 | 3/1993 | Anderson et al. . |
| 5,243,183 | 9/1993 | Barron, Jr. et al. . |

Primary Examiner—Richard A. Rosenberger
Attorney, Agent, or Firm—Bryan Cave; David M. Klein

[57] ABSTRACT

An apparatus for measuring the dimensions or volume of an object on a conveyor is disclosed. A light source on one side of the conveyor is focused onto a spinning scanning drum having a pattern of holes therethrough. The holes are arrayed in a spiral pattern. The rotating drum is positioned parallel to the dimension to be measured between the source of light and a light detector on the other side of the conveyor from the light source. The pattern of holes is arranged so that when the scanning drum rotates a scanning pattern is generated across the conveyor. The light detector on the other side of the conveyor generates an output signal each time a beam of light passes through the rotating scanning drum and across the conveyor. A controller receives the output signal and correlates the output signal with the scanning pattern using a look-up table. Using this information, the controller determines from the scanning pattern and the detected output signals, the dimension of the object. If more than one dimension is to be measured, a height measuring unit and a width measuring unit may be positioned around the conveyor. From the measured height, width and length, the controller determines the volume of the object. A method and apparatus are provided for determining the volume of boxes passing on the conveyor with are positioned at an angle relative to the conveyor.

40 Claims, 6 Drawing Sheets

FIG. 4

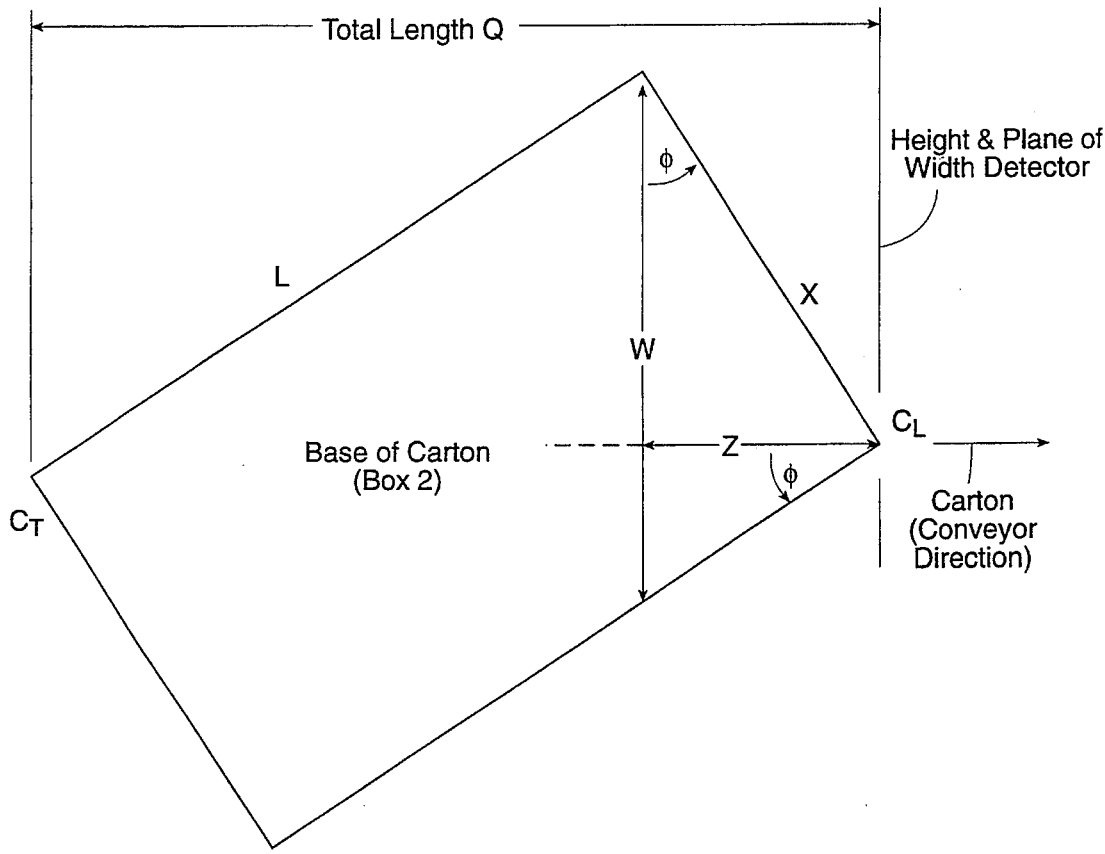

1. Measure Time $t_Z$ from Corner '$C_L$' (Width Greater Than 0) Until Width = Max Width W 2. If Conveyor speed is S, Then $\boxed{Z = St_Z}$ 3. Measure Time $t_Q$ from Corner '$C_L$' (Width Greater Than C Until Corner '$C_T$' (Width=0). $\boxed{Q = St_Q}$ 4. From Trigonometric Identity $\sin 2\phi = 2\sin\phi\cos\phi$, with $\sin\phi = Z/X$, $\cos\phi = X/W$ $\sin 2\phi = 2*Z/X * X/W = 2*Z/W$ $\boxed{\phi = \frac{1}{2} \text{Arc Sin} 2*Z/W}$ 5. $\boxed{X = W\cos\phi}$ 6. Since $Q = Z + L\sin\phi$ Then $\boxed{L = (Q - Z)/\sin\phi}$

DIMENSION-MEASURING APPARATUS

BACKGROUND OF THE INVENTION

1. Field of the Invention

The present invention relates generally to dimension measuring systems and more particularly to a dimensioning system utilizing one or more spinning scanning drums having light transmitting holes extending therethrough to provide fast and accurate volume measurements even under adverse operating conditions.

2. Description of the Related Art

Systems for determining the three dimensional measurements of objects are well known. Typically, such devices transmit beams of light across a conveyor in the path of the object to be measured. If width and height are to be measured, a frame is positioned around the conveyor with the vertical frame members transmitting and receiving beams for determining the height of the object, and the horizontal frame members transmitting and receiving beams for determining the width of the object. Still further means may be used for determining the length of the box. If the object is oriented at an angle relative to the conveyor, an algorithm may be employed for determining the actual volume of the box.

U.S. Pat. No. 4,773,029 discloses one such method for determining the three dimensional measurements of objects passing on a conveyor. A frame is placed around the conveyor, the frame having two transmitter sides and two receiver sides, with the transmitters opposed from the receivers. Each transmitter side comprises an array of light emitting diodes, and each receiver side comprises a light receiver for each LED. The method includes a signal processing algorithm to insure that light between a single light emitter and single light receiver is unambiguously received.

Another device for measuring the dimensions of an object is shown in U.S. Pat. No. 4,192,613. This device also comprises opposed transmitting and receiving frame members wherein the transmitting frame member comprises a plurality of closely spaced LED light transmitters, and the receiver comprises a light detector for each transmitted light beam. Other devices which employ opposed light transmitters and light receivers wherein each light receiver has a corresponding light transmitter are shown in U.S. Pat. Nos. 5,130,532; 5,198,661; and 5,243,183.

An inherent limitation in such devices is that the maximum resolution achievable is determined by the density of light transmitters on the light transmitting side of the measuring apparatus, and the density of the light receivers which may be placed on the receiving end of the measuring apparatus. For example, in order to register measurements on the order of 0.1 inches, the light transmitters and the light receivers must be very densely packed. This is not only difficult from a manufacturing standpoint, but it is expensive. Also, detection and replacement of defective transmitting and receiving elements is difficult. Accordingly, it would be desirable to have an apparatus which could accurately measure the dimensions of an object passing on a conveyor, without the need for densely packed transmitter and receiver units.

Another device for measuring the dimensions of an object is shown in U.S. Pat. No. 3,943,361. This device includes a rotating drum which having reflectors arranged in a spiral path along the surface of the drum. A light source is aimed at the reflectors, which are angled so that as the drum rotates a scanning light beam is directed across a conveyor. A photo-detector is aimed at the conveyor and registers light as it is reflected from an object passing on the conveyor. Because the measurement of the dimensions of the box are based upon reflection, boxes which are angled relative to the conveyor may be inaccurately measured, and the reflectivity of the box and/or background lighting may lead to errors as well.

SUMMARY OF THE INVENTION

The present invention an apparatus for measuring a dimension or the volume of an object passing on a conveyor. In the apparatus, a source of light is disposed on one side of the conveyor which focuses light on a cylindrical scanning drum having a pattern of holes arrayed in co-planar pairs spaced 180 degrees from each other. The scanning drum is positioned parallel to the dimension to be measured between the source of light and the object. A motor rotates the drum, and light from the light source passes through each set of holes as they are aligned with the light source and across the conveyor. The pattern of holes is arranged so that when the scanning drum rotates a scanning pattern is generated across the conveyor.

A light detector is positioned parallel with and on the other side of the conveyor from the light source. The scanning drum may be on the same side of the conveyor or on the other side of the conveyor from the light detector. The light detector generates an output signal each time a beam of light passes across the conveyor and through the rotating scanning drum. A controller receives the output signal from the light detector and correlates the output signal with the scanning pattern using a look-up table to determine the particular holes in the scanning drum which caused the output signal to be generated. Using this information, the controller determines from the scanning pattern and the detected output signals, the dimension(s) of the object passing on the conveyor.

The light source is preferably one or more infrared LED's Fresnal lenses are used for focusing the light from the LED's onto the scanning drum and from the scanning drums onto the light detectors. In order to protect against interference due to background light, the LED's are modulated at a modulation frequency and the light detector includes a band pass filter at the modulation frequency. The light from the LED's is also preferably at a particular wavelength, and the light detector includes a light discriminator which rejects light which is not in the range of the particular wavelength.

The pattern of holes on the scanning drum is preferably a plurality of parallel spiral patterns. Each scanning drum includes a position sensor for enabling the controller to determine the rotational position of the scanning drum every one-half revolution thereof.

The controller is microprocessor based and includes look-up tables correlating the scanning pattern with the rotational position of the scanning drum and relating each hole of the scanning pattern to the measurement of the dimension to be measured. Using the look-up tables, the controller determines, from the time at which output signals are received, the particular holes on the scanning pattern which caused the output signals to be generated. From this information, the controller derives the dimension(s) of the object.

If desired, a second scanning drum identical to the first scanning drum may be oriented parallel to the first with the first scanning drum positioned between the second scanning drum and the light source. The drums are synchronously rotated with their holes aligned, and the dimension determination occurs as described above. The drums may be located on the same or opposite sides of the conveyor. With this embodiment, improved accuracy may be achieved.

If more than one dimension is to be measured, a height measuring unit and a width measuring unit, each including the above components, may be positioned around the conveyor.

A method and apparatus are also provided for determining the volume of boxes passing on the conveyor with are positioned at an angle relative to the conveyor.

BRIEF DESCRIPTION OF THE DRAWINGS

FIG. 4 shows and describes the method of the invention for calculating the volume of boxes positioned at an angle on a conveyor.

DESCRIPTION OF THE PREFERRED EMBODIMENT

Figure 1:
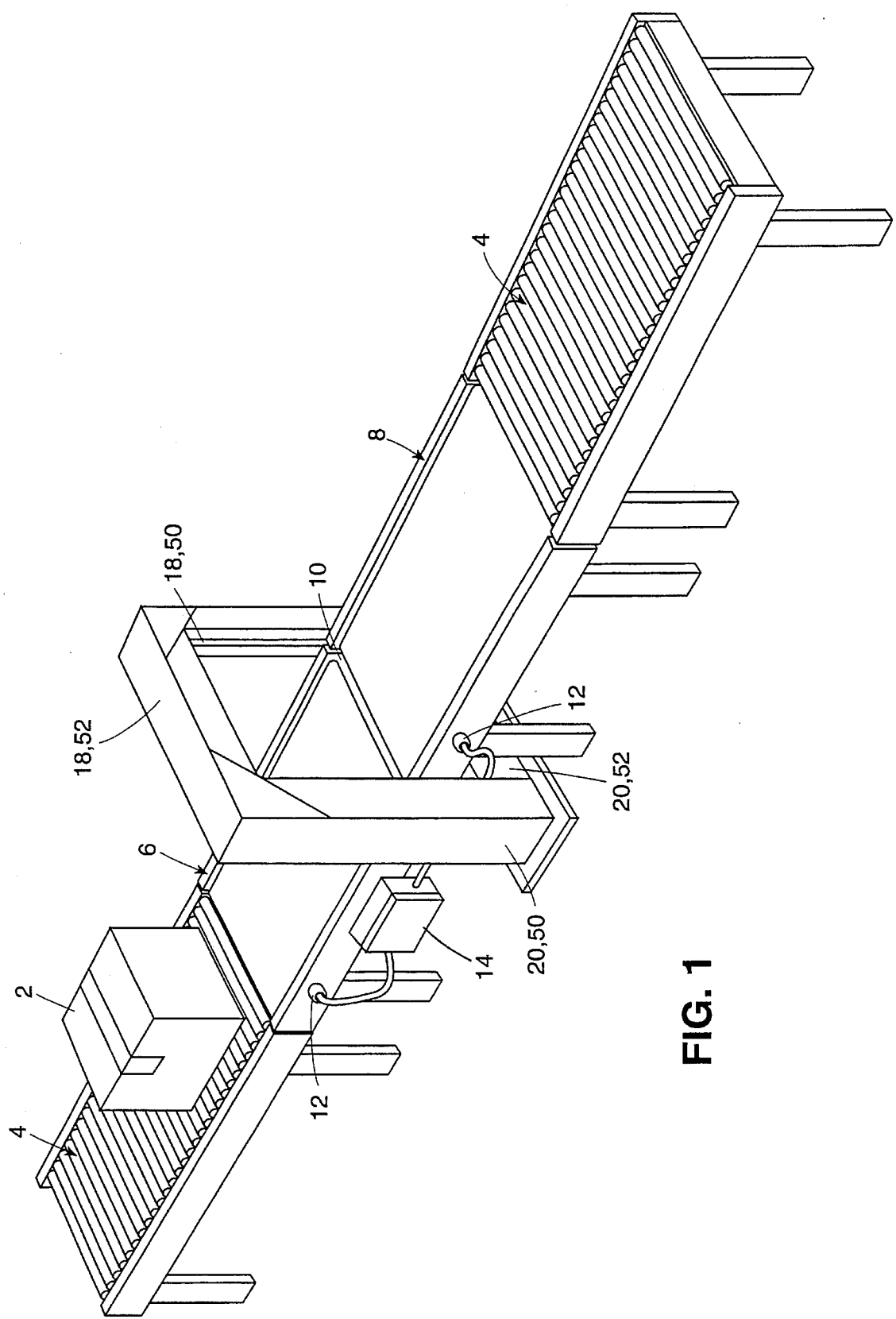
FIG. 1 is a perspective view of the apparatus of the present invention.
Figure 2:
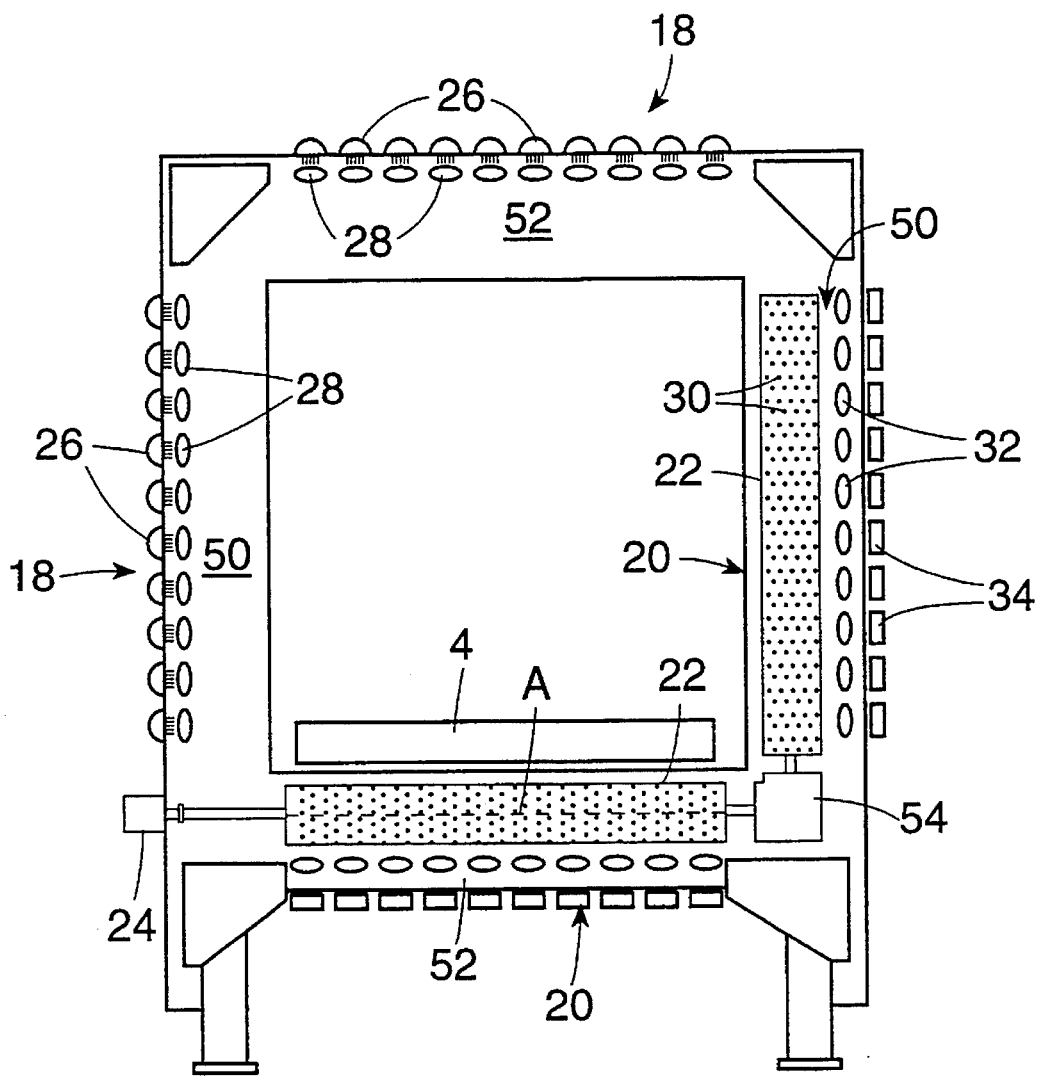
FIG. 2 is an end view of the apparatus of the present invention.

As shown in FIGS. 1 and 2, the present invention is an electronic system for computing the dimensions of a box 2 passing on a conveyor 4. While the invention will be described with respect to measuring the dimensions of a box, it is understood that the system may also measure the maximum dimensions of any type of object, including stationary objects if used without a conveyor. Conveyor 4 includes a feed conveyor 6 and an output conveyor 8, with the box being moved in the direction from the feed conveyor 6 to the output conveyor 8. Feed conveyor 6 and an output conveyor 8 are preferably synchronized by a drive belt or chain or any other type of linkage. A gap 10 is provided between conveyors 6 and 8 as discussed in detail below. Conveyors 6 and 8 may be of any type conventionally known in the art, and may be individually or independently driven by any conventional drive means. One or both of the feed conveyor 6 and output conveyor 8 may also include a scale or may be modular, such as shown in commonly owned U.S. Pat. No. 5,304,745.

Conveyors 6 and 8 include a tachometer 12 for generating a signal representative of the speed of the conveyors, and thus the speed of box 2 along the conveyors. Tachometer 12 is preferably either a conventional magnetic or optical tachometer, the output of which is fed to a system controller 14 which regularly computes the speed of the conveyor. The output of any scale under the conveyors is also regularly fed to controller 14 which calculates the weight of objects passing on the conveyor 4.

As the box moves along the conveyor 4, it passes through a height measuring station 50 and a width measuring station 52 which are generally identical. Each of the measuring stations 50 and 52, includes a transmitting unit 18 on one side of the conveyor, and a receiving unit 20 on the other side of the conveyor. Transmitting unit 18 includes a scanning drum 22 which is rotated by a conventional electric motor or air driven motor 24. The scanning drum for each of the height and width measuring stations 50 and 52 may be driven by a single drive motor through a precision right angle drive 54, if desired.

The length of each drum 22 (and associated transmitting and receiving equipment) will vary, but should be as long as the maximum dimension size to be measured. While the system will be described with respect to continuous 37.5" long drums, the system is preferably modular, and includes shorter, i.e., 10–12.5" long, drums and transmitting and receiving equipment which may be coupled together to handle objects of larger dimensions.

Drums 22 are preferably made of aluminum tubing having a diameter of 5 inches. It is foreseen that drums 22 can be made of any appropriate material, including molded thermoplastic.

Figure 3:
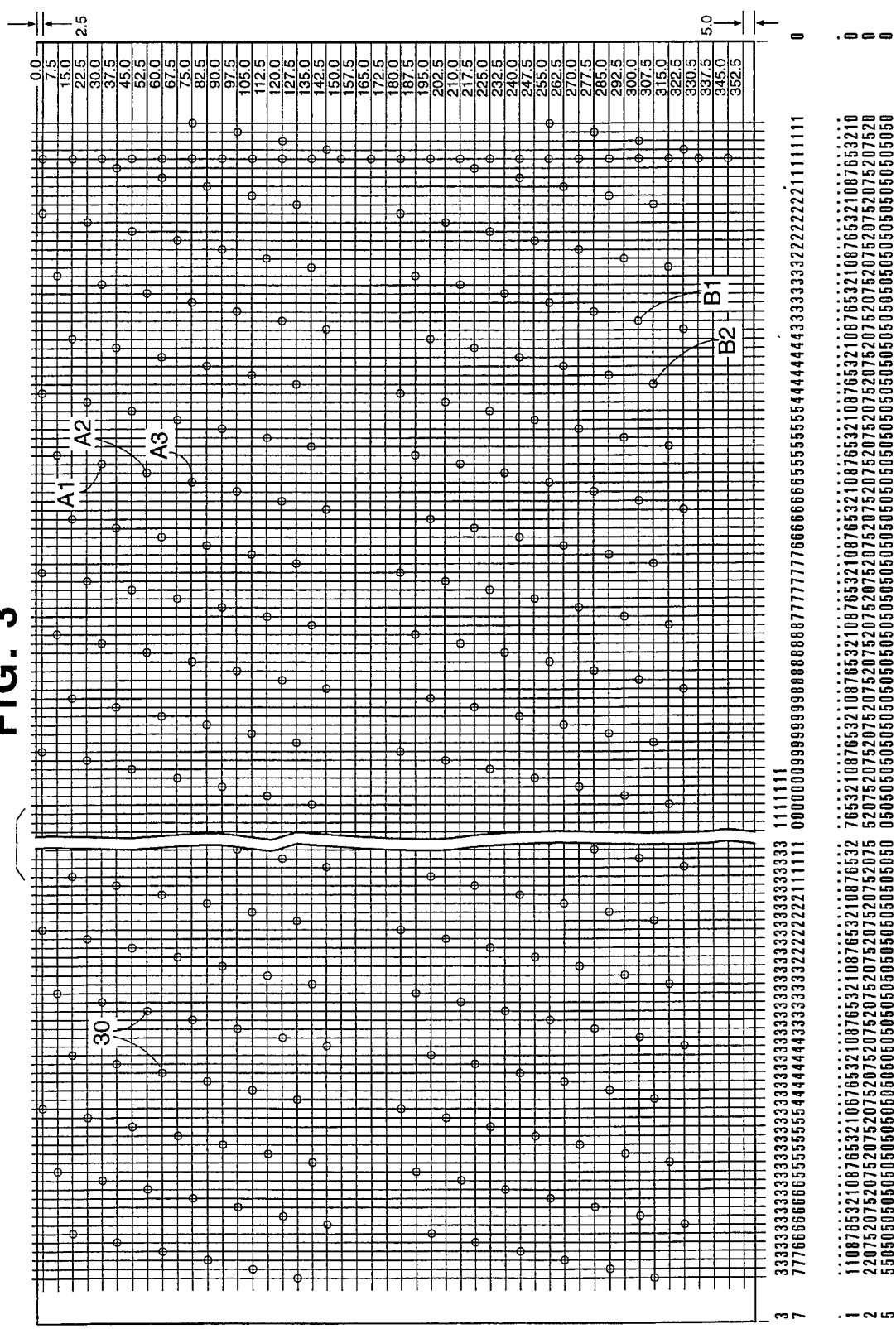
FIG. 3 shows a sample hole pattern on the scanning drums of the invention.

Each drum 22 has a spiral pattern of holes 30 extending therethrough, with the holes 30 passing through a central longitudinal axis A of the drum 22. A preferred hole pattern for a 37.5" drum having a resolution of about 0.1 inches is shown in FIG. 3. Each hole 30 is circular and has a diameter of ⅛ inches. It is foreseen that holes 30 may be rectangular, square, or have any other desired shape. In fact, rectangular holes provide improved resolution, but are more difficult to manufacture. Accordingly, an alternative drum design is manufactured from molded thermoplastic having rectangular holes molded therein.

One or more light sources 26 are arranged to direct light or other radiation toward the drums 22. Light sources 26 are preferably infrared light-emitting diodes (LED's) modulated at 38 Khz by system controller 14 or other modulation means. The modulation reduces the susceptibility of the system to background noise. The light generated by LED's 26 preferably has a wavelength of about 900 nm, although light of any appropriate frequency and/or wavelength may be utilized. The light generated by LED's 26 passes through fresnal lenses 28, which provide a uniform illumination of the scanning drums 22.

Fresnal lenses 28 are used to gather the light from the LED's and to focus the light on the drums. Other types of lenses may be used, if desired, or no lens may be used, provided that the LED's have sufficient power to properly illuminate the drums.

As indicated above, the holes 30 are arranged in pairs, with each pair member directly opposite the other. As each drum spins with LED's 26 illuminated, each pair of holes is in turn momentarily aligned with the path of the light, allowing the light to pass across the conveyor 4 and through the drum 22. Since the spiral hole pattern on each drum 22 repeats every 180 degrees, for each full revolution of the drum, the IR beam will scan the full height of the drum twice. The scanning pattern, however, is not sequential, i.e. it does not scan at full resolution from top to bottom or vice versa. A single continuous spiral with holes spaced only by the maximum resolution of the system would be required to scan sequentially. Although such a pattern is foreseen, it is not desirable since it would structurally weaken the drum and would increase the likelihood of errors related to light crossing over between adjacent holes. Rather, the pattern of holes in the drum is such that as the drum rotates, sequential holes in the direction of rotation of the drum (for example holes B1, and B2) are longitudinally spaced from each other. This reduces the tendency of light to cross over from one hole to the next. Also, the closest longitudinally spaced holes, which determine the resolution of the drum (for example, holes A1, A2 and A3) are spaced around the circumference of the drum. This improves the structural integrity of the drum. In a preferred embodiment, the resolution of the present system is 0.125" in each dimension, i.e., holes A1, A2 and A3 are each spaced 0.125" from each other longitudinally. It is foreseen that improved resolution may be achieved by varying the hole spacing and/or pattern, and by employing algorithms or equipment to reduce beam spreading.

In a preferred embodiment, for each 12.5" section of drum, 5 LED's are used, along with 5 fresnal lenses. Each LED/lens pair illuminates 2½ inches of the drum. The LED's are spaced from the lenses by about 2½ inches. Alternatively, a single LED/lens pair may be utilized to illuminate the entire 12.5 inch drum section. In such an embodiment, the lens must be further spaced from the LED for the lens to properly illuminate the drum, which is not desirable. It is foreseen that other variations exist which would illuminate the drum in a manner sufficient for the system to operate, including direct lighting without the use of a lens.

After the light crosses the conveyor 4, it is received by light receiving unit 20. Light receiving unit 20 includes another set of fresnal lenses 32 which focus the light from the transmitting unit onto light detectors 34. Fresnal lenses 32 on the light receiver are preferably identical to fresnal lenses 28 on the light transmitter. IR detectors 34 are preferably conventional light detection units, such as the Optic Sensor Light Detecting Units (P/N GP1U59X) from Sharp Electronics Co.™. These devices include a light discriminator which permits the 900 nm light generated by LED's 26 to be transmitted while rejecting other light sources. IR detectors 34, are also each equipped with a 38 Khz+/–5 Khz band-pass filter so as to detect the 38 KHz light transmitting by the light transmitter. The light discriminators and band-pass filters reduce inaccuracies induced by dust, background light, and other causes of variation in the infrared beams. Of course, the light modulation and/or discrimination elements may not be used, although reduced performance would likely result.

For each 12.5" of drum, the receiving unit preferably has five fresnal lenses 32, each 2½" long, which direct the light passing through the drums onto five IR detectors 34. Using such lenses, the IR detectors are preferably positioned about 2½ inches from the lenses. Once again, it is foreseeable that other types of detection optics may be used that are within the scope of the invention. Each IR detector 34 generates an output signal when it detects light above a predetermined threshold, i.e. light which was transmitted through drums 22. The five outputs from the detectors 34 are joined together through a gate, the output of which is fed to controller 14. Thus, controller 14 receives a single binary input when light is detected from any of the detectors 34.

Each drum 22 is equipped with either an optical or magnetic index sensor (not shown) which generates a signal each ½ revolution of the drum. This signal is read by controller 14 and allows the controller to determine the rotational position of the drum each ½ rotation. Using this information, the controller 14 computes the rotational speed of the drums. Controller 14 includes a microprocessor, preferably a Siemens™ 80C515, which handles the necessary processing for determining the dimensions of the box 2. Controller 14 may also display the results on a conventional display, or transmit the volume/weight data to another computer for further processing. Since the pattern of holes on the drums is preferably not sequential, the controller 14 includes a look-up table which relates the rotational position of each drum to the hole pattern on the drum. The controller also includes a look-up table which relates each hole of the hole pattern to the dimension being measured, i.e. the width or height of the object being measured. In this manner, provided that the controller can determine the rotational position of the drum, it can associate non-received light (light interrupted by an object passing on the conveyor) with the dimensions of the object interrupting the light. It will be appreciated that the two look-up tables may be combined into a single look-up table which relates the rotational position of each drum to the dimension being measured.

The controller 14 includes a timer for each drum which is reset every one-half revolution of the drum. When the controller receives a signal from the detectors 34 that light has been detected, the controller utilizes the speed of the drum, the time since the beginning of the current one-half revolution of the drum, and the look-up table to determine the location of the hole through which the detected light was transmitted.

The conveyor 4 transports the box 2 between the light transmitter 18 and light receiver 20. As the box 2 passes, it interrupts the scanning beam and the controller 14 determines the holes through which the beam was interrupted, and thus determines the dimension to be measured. While the object is between the light transmitter and receiver, its height and width are measured twice for every revolution of the drums. In a preferred embodiment, the scanning drums rotate at 1800 rpm and the conveyor moves at about 200 feet per minute.

As shown in FIG. 2, in order to measure the volume of a rectangular object, two transmitter/receiver pairs are required; the first is arranged to scan with a vertical scanning pattern, and measure height; the second, arranged to scan across, measures width. In an embodiment of the invention shown in FIG. 2, which uses a single drum to measure each dimension, it is preferred that the drum be located on the same side of the conveyor as the light detector. Nonetheless, it is foreseen that the scanning drum may be placed on either the same side of the conveyor as the light detector or the side of the light transmitter, or both, as discussed below.

In order to measure the length of the box 2 in the direction of movement of the conveyor 4, a conventional photoelectric beam-type transmitter (not shown) may be placed on one side of the conveyor, and a beam receiver (not shown) is placed on the opposite side of the conveyor. The beam transmitter generates a narrow light or IR beam which is aimed at receiver. The output of the receiver is connected to controller 14. When the beam is interrupted by a box passing on the conveyor, controller 14 determines the amount of time the beam is interrupted. Using this information and the speed of the conveyor 4, which is known from tachometer 12, the controller 14 determines the length of the box using the equation $S = V * T$; where S is the length of the box, V is the speed of the conveyor, and T is the time for which the beam is interrupted.

In the alternative, the controller 14 may determine the length by determining T by running a timer which counts the duration between the first beam of either the vertical or horizontal scanning beams which is interrupted by the box as it passes, and the last beam interrupted as the box leaves the filed of view of the scanning beams.

As shown in FIG. 4, if the box is not set on the conveyor exactly parallel to the conveyor, calculation of the volume of the box is more difficult. Once the controller 14 detects a forward corner $C_n$ of box 2, controller 14 measures the time $T_z$ until the width of the box 2 is maximized at width W, which may be determined from the horizontally mounted scanning drum. Since the conveyor speed is S, distance Z is equal to $S * T_z$. The controller 14 also detects the time Tq from the detection of corner $C_L$ to the detection of corner $C_l$, when the object passes from the beams. Length Q is equal to $S * Tq$. Using the trigonometric identity:

where
$$\sin 2\phi = 2\sin\phi\cos\phi$$

and
$$\sin\phi = \frac{z}{x}$$

Then
$$\cos\phi = \frac{x}{w}$$

$$\phi = \frac{1}{2} \arcsin\left(2 * \frac{z}{w}\right)$$

Thus,
$$X = W\cos\phi$$

Also, since
$$Q = Z + L\sin\phi$$

then
$$L = \frac{(Q - Z)}{\sin\phi}$$

Figure 5:
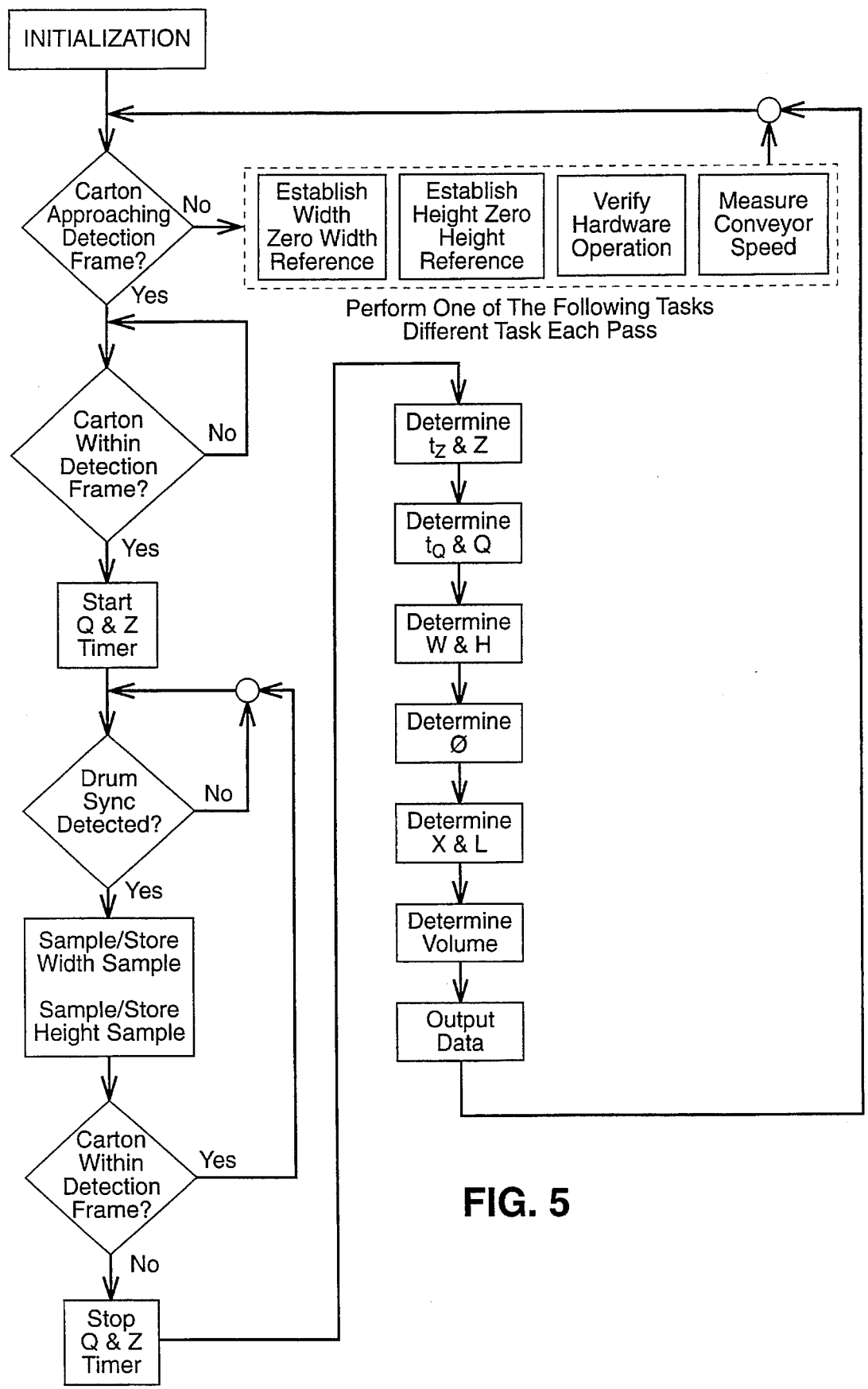
FIG. 5 is a flow chart showing the method of the invention for calculating the volume of boxes positioned and angled on the conveyor.

Finally, controller 14 calculates the volume of the box 2 by multiplying X, L, and the height H. It is foreseen that other mathematical algorithms may be used to determine the dimensions of the box 2. The method of operation of the controller 14 is shown in FIG. 5.

As the light from the each source passes through the holes in the druans, the light begins to disperse. This dispersion may induce errors in the determination of the dimensions of the object to be measured since the beam spreads. One method of reduce the dispersion is to reduce the size of the holes through the drums. Another method of reducing the dispersion is to use rectangularly shaped holes.

Figure 6:
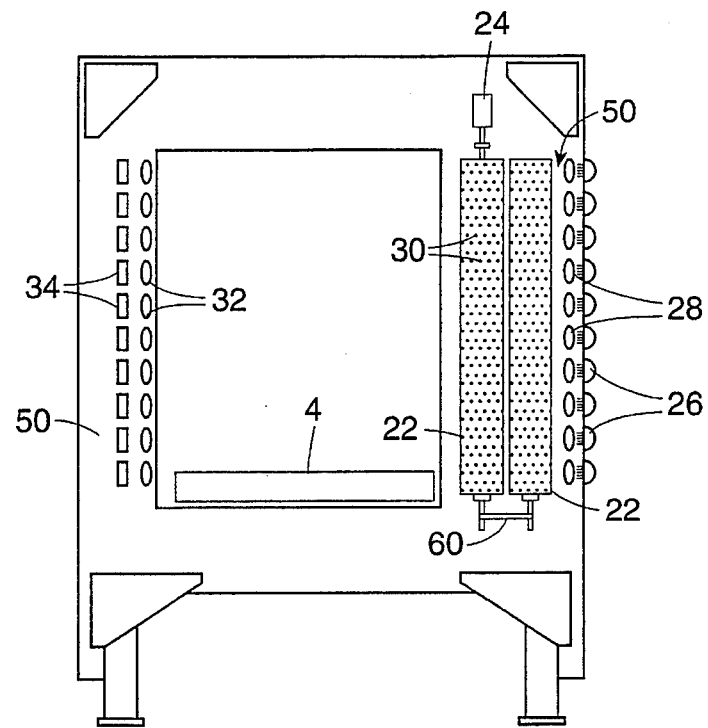
FIG. 6 shows an alternative embodiment of the invention which includes two scanning drums for each dimension, wherein the scanning drums are positioned on the same side of the conveyor.
Figure 7:
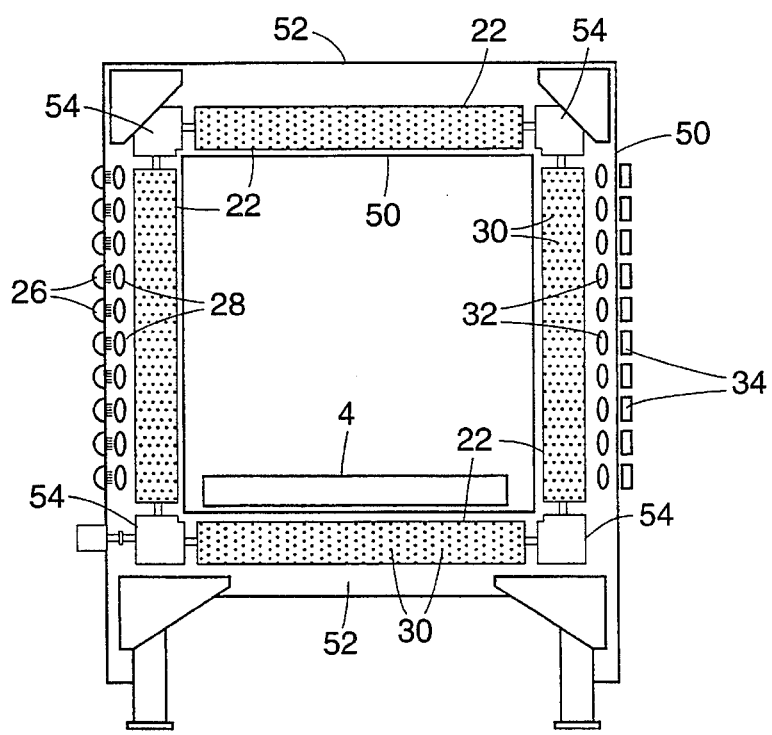
FIG. 7 shows an alternative embodiment of the invention which includes two scanning drums for each dimension, wherein the scanning drums are positioned on opposite sides of the conveyor.

In the alternative embodiments as shown in FIGS. 6 and 7, two drums 22 may be used to measure each dimension. In this embodiment, each of the drums measuring each dimension is identical, and the drums measuring each dimension are synchronized to one another, such as by belt drive means 60. Thus, the only light that will be detected by the detector is that which passes through the first drum, and the second drum, i.e. only light that makes a straight line from the light source to the light detector. This substantially eliminates dispersion errors. Moreover, the width of each drum may be reduced as well.

In the embodiment shown in FIG. 6, the dispersion effect is reduced by synchronizing two identical drums which are adjacent to each other on the light source side of the conveyor. The drums are synchronized by a conventional drive belt or chain 60. Only a narrowly focused beam will pass through both drums. Since the beam is more narrowly focused, the dispersion effect will be reduced. It will be appreciated that an identical measuring unit (not shown) may be used to measure the width of the box. Also, the synchronized drums may be located on either the light source side of the conveyor or the light detector side of the conveyor.

In the embodiment shown in FIG. 7, the two synchronized identical drums are disposed on opposite sides of the conveyor. The drums in this embodiment are synchronized by a conventional right-angle drive.

Although the present invention has been described in detail with respect to certain embodiments and examples, variations and modifications exist which are within the scope of the present invention as defined in the following claims.

We claim:

1. An apparatus for measuring a dimension of an object on a conveyor, the apparatus comprising:

a source of light disposed on one side of the conveyor;

first and second scanning drums, each having a cylindrical surface coaxial with a central axis, each drum comprising a pattern of holes extending through the cylinder whereby the holes are arrayed in co-planar pairs, each member of each pair spaced 180 degrees from the other, each cylindrical drum positioned adjacent to the conveyor with the central axis of the drum parallel to the dimension to be measured with the first scanning drum positioned between the second scanning drum and the light source;

means for synchronously rotating the first and second drums at an angular velocity with the pattern of holes on each aligned with the other, whereby light from the light source passes through the aligned holes of the drums;

a light detector parallel with and on the other side of the conveyor from the light source, the scanning drums positioned between the source of light and the light detector, whereby light from the light source passes across the conveyor and through the holes aligned with the light source, the pattern of holes arranged so that as the scanning drums rotate a scanning pattern is detectable at the light detector, the light detector generating an output signal in response to the detected light; and a controller for receiving the output signal from the light detector, the controller comprising means for determining from the scanning pattern and from the output signal the dimension of the object passing on the conveyor.

2. The apparatus according to claim 1 wherein the first scanning drum is positioned on the same side of the conveyor as the light source.

3. The apparatus according to claim 2 wherein the second drum is on the same side of the conveyor as the first drum.

4. The apparatus according to claim 2 wherein the second drum is on the other side of the conveyor from the first drum.

5. The apparatus according to claim 1 wherein the first scanning drum is positioned on the same side of the conveyor as the light detector.

6. The apparatus according to claim 1, wherein the light source comprises one or more infrared LED's.

7. The apparatus according to claim 6 further comprising at least one fresnal lens for focusing the light from the LED's onto the first scanning drum.

8. The apparatus according to claim 7 further comprising at least one fresnal lens adjacent to the light detector for focusing the light transmitted through the scanning drums onto the light detector.

9. The apparatus according to claim 6 wherein the LED's are modulated at a modulation frequency and wherein the light detector comprises a band pass filter at the modulation frequency.

10. The apparatus according to claim 9 wherein the light from the LED's is at a particular wavelength, and wherein the light detector comprises a light discriminator which rejects light which is not in the range of the particular wavelength.

11. The apparatus according to claim 6 wherein the pattern of holes on the scanning drums is a spiral pattern.

12. The apparatus according to claim 1 further comprising:

a position sensor on one of the scanning drums; the controller comprising means for determining from the position sensor the rotational position of that scanning drum at least every one-half revolution thereof.

13. The apparatus according to claim 12 wherein the controller further comprises:

a first look-up table correlating the scanning pattern with the rotational position of the scanning drums;

a second look-up table relating each hole of the scanning pattern to the measurement of the dimension to be measured;

means for calculating the rotational velocity of the scanning drums;

means for determining the particular holes on the scanning pattern that caused the output signals to be generated using the first look-up table;

and means for determining from the second look-up table the dimension of the object.

14. The apparatus according to claim 12 wherein the controller further comprises:

a look-up table correlating the scanning pattern with the measurement of the dimension to be measured;

means for calculating the rotational velocity of the scanning drums; and means for determining from the time at which output signals are generated the dimension of the object using the look-up table.

15. The apparatus according to claim 1 wherein the means for synchronously rotating the drums comprises a belt or chain extending between the first and second drums.

16. An apparatus for measuring the volume of an object on a moving conveyor, the apparatus comprising:

a) means for determining the speed of the conveyor:

b) a first source of light disposed on one side of the conveyor;

c) a second source of light disposed either above or below the conveyor at an end thereof;

d) a first light detector parallel with and on the other side of the conveyor from the first light source;

e) a second light detector parallel with and across the path of the object from the second light detector;

f) a height scanning drum, a width scanning drum, and a second scanning drum each having a cylindrical surface coaxial with a central axis, each comprising a pattern of holes extending therethrough whereby the holes are arrayed in co-planar pairs, each member of each pair spaced 180 degrees from the other;

the height scanning drum positioned adjacent to the conveyor between the first source of light and the first light detector with its central axis vertical, whereby light from the first light source passes through the holes of the height scanning drum aligned with the first light source and across the conveyor, the pattern of holes on the height scanning drum arranged so that a vertical scanning pattern is detectable at the first light detector during rotation of the height scanning drum;

the width scanning drum positioned adjacent to the conveyor with its central axis horizontal and perpendicular to a direction of motion of the conveyor, the width scanning drum positioned between the second source of light and the second light detector, whereby light from the second light source passes through the holes of the width scanning drum aligned with the second light source and across the path of the object, the pattern of holes on the width scanning drum arranged so that a horizontal scanning pattern is detectable at the second light detector during rotation of the width scanning drum;

the second scanning drum being associated with at least one of the height or width scanning drums and identical thereto, the second scanning drum and the associated height or width scanning drum oriented parallel to each other with the height or width scanning drum positioned between the second scanning drum and the light source associated with the height or width scanning drum;

g) means for rotating the vertical and horizontal scanning drums;

h) means for synchronously rotating the second drum and the associated height or width scanning drum with the pattern of holes on each aligned with the other;

i) the first light detector comprising means for generating a first output signal in response to detected light;

j) the second light detector comprising means for generating a second output signal in response to detected light; and k) a controller comprising means for receiving the first and second output signals and for determining the volume of the object passing on the conveyor from the vertical and horizontal scanning patterns, the first and second output signals, and the speed of the conveyor.

17. The apparatus according to claim 16, wherein the first and second light sources comprise one or more infrared LED's.

18. The apparatus according to claim 17 further comprising at least one fresnal lens associated with the first or second light source for focusing the light from the LED's onto the width or height scanning drum associated with that light source.

19. The apparatus according to claim 18 further comprising at least one fresnal lens adjacent to each light detector for focusing the light transmitted through each scanning drum onto the light detector associated with that scanning drum.

20. The apparatus according to claim 17 wherein the LED's are modulated at a modulation frequency and wherein each of the light detectors comprises a band pass filter at the modulation frequency.

21. The apparatus according to claim 20 wherein the light from the LED's is at a particular wavelength, and wherein each light detector comprises a light discriminator that rejects light which is not in the range of the particular wavelength.

22. The apparatus according to claim 17 wherein the pattern of holes on the scanning drums is a spiral pattern.

23. The apparatus according to claim 16 further comprising:

a position sensor on each scanning drum;

the controller further comprising means for determining the rotational position of each scanning drum at least every one-half revolution thereof.

24. The apparatus according to claim 23 wherein the controller further comprises:

a first look-up table correlating the vertical scanning pattern with the rotational position of the height scanning drum; and a second look-up table relating each hole of the vertical scanning pattern to the measurement of the vertical height of the object;

a third look-up table correlating the horizontal scanning pattern with the rotational position of the width scanning drum; and a fourth look-up table relating each hole of the horizontal scanning pattern to the measurement of the width of the object;

means for calculating a rotational velocity of each scanning drum;

means for determining from the time at which the first and second output signals are received the particular holes on the vertical and horizontal scanning patterns that caused the output signals to be generated using the first and third look-up tables; and means for determining from the second and fourth lookup tables the vertical height and width of the object.

25. The apparatus according to claim 24 further comprising means for determining the length of the object; and means for determining the volume of the object from the length, the width and the height of the object.

26. The apparatus according to claim 25 wherein the means for determining the length of the object comprises a photoelectric beam directed across the conveyor in the path of the object;

the controller further comprising means for timing interruptions of the beam and for calculating the length of the object from the beam interruption time and the speed of the conveyor.

27. The apparatus according to claim 25 wherein the means for determining the length of the object comprises means for determining a first and last interruption of either the vertical or horizontal scanning patterns as the object passes on the conveyor, the controller further comprising means for calculating the length of the object from the duration between the first and last interruption and the speed of the conveyor.

28. The apparatus according to claim 16 wherein the second scanning drum is associated with the height scanning drum and further comprising:

a third scanning drum associated with the width scanning drum and identical thereto, the third scanning drum and the width scanning drum oriented parallel to each other with the width scanning drum positioned between the third scanning drum and the second light source; and means for synchronously rotating the third scanning drum and the width scanning drum with the pattern of holes on each aligned with the other.

29. The apparatus according to claim 28 wherein the second drum is on the same side of the conveyor as the height scanning drum, and the third drum is on the same side of the conveyor as the width scanning drum.

30. The apparatus according to claim 28 wherein the second drum is on the same or opposite side of the conveyor from the height scanning drum, and the third drum is on the same or opposite side of the conveyor from the width scanning drum.

31. A method of measuring the volume of an object on a moving conveyor, the method comprising the steps of:

a) determining the speed of the conveyor:

b) vertically positioning a height scanning drum adjacent to the conveyor between a first source of light on one side of the conveyor and a first light detector on the other side of the conveyor, a pattern of holes on the height scanning drum arranged so that a vertical scanning pattern is detectable at the first light detector during rotation of the vertical scanning drum;

c) horizontally positioning a width scanning drum adjacent to the conveyor perpendicular to a direction of motion of the conveyor between a second source of light located above or below the conveyor at an end thereof and a second light detector located parallel with and across the path of the object from the second light source, a pattern of holes on the width scanning drum arranged so that a horizontal scanning pattern is detectable at the second light detector during rotation of the width scanning drum;

d) providing a second scanning drum associated with one of the height or width scanning drums and identical thereto;

e) positioning the second scanning drum parallel to the associated height or width scanning drum with the associated height or width scanning drum positioned between the second scanning drum and the light source associated with the height or width scanning drum;

f) rotating the vertical scanning drum;

g) rotating the horizontal scanning drum;

h) synchronously rotating the second drum and the associated height or width scanning drum with the pattern of holes on each aligned with the other;

i) generating a first output signal in response to the detection of light at the first light detector;

j) generating a second output signal in response to the detection of light at the second light detector; and k) determining the volume of the object passing on the conveyor from the first and second output signals the vertical and horizontal scanning patterns, and the speed of the conveyor.

32. The method according to claim 31 further comprising the step of focusing the light from each light source onto the scanning drum associated with that light source.

33. The method according to claim 31 further comprising the steps of:

modulating the light from each of the light sources at a modulation frequency; and filtering light detected at each light detector at the modulation frequency.

34. The method according to claim 31 wherein light is generated at each light source at a particular wavelength; and further comprising the step of rejecting light which is not in the range of the particular wavelength.

35. The method according to claim 31 further comprising the step of focusing the light transmitted through each scanning drum onto the light detector associated with that scanning drum.

36. The method according to claim 31 further comprising the step of:

determining the rotational position of at least one scanning drum at least every one-half revolution thereof 37. The method according to claim 36 wherein:

the step of determining the volume of the object comprises:

correlating the vertical scanning pattern with the rotational position of the height scanning drum;

relating each hole of the vertical scanning pattern to the measurement of the vertical height of the object;

correlating the horizontal scanning pattern with the rotational position of the width scanning drum; and relating each hole of the horizontal scanning pattern to the measurement of the width of the object;

calculating the rotational velocity of each scanning drum;

determining from the time at which the first and second output signals are received the particular holes on the vertical and horizontal scanning patterns which caused the output signals to be generated, and determining the vertical height and width of the object.

38. The method according to claim 36 wherein the step of determining the volume of the object comprises calculating a rotational velocity of each scanning drum, and determining the vertical height and width of the object from at least one look-up table.

39. The method according to claim 31 wherein the step of determining the volume of the object comprises:

determining the length of the object; and determining the volume of the object from the length, the width and the height of the object.

40. The method according to claim 31 wherein the step of determining the volume of the object comprises the steps of:

detecting a forward corner $C_L$ of the object;

measuring the time $T_z$ until the width of the object is maximized at width W;

determining the distance $Z = S * T_z$, where S is equal to the speed of the conveyor and Z is the distance from $C_L$ to the location where the width of the object is first maximized;

detecting the time Tq from the detection of corner $C_L$ to the detection of a rear corner $C_t$;

determining length Q between $C_L$ and $C_t$;

determining the length L and width X of the object using the equations:

with
$$\sin 2\phi = 2\sin\phi\cos\phi$$

and
$$\sin\phi = \frac{z}{x}$$

Therefore
$$\cos\phi = \frac{x}{w}$$

and
$$\phi = \frac{1}{2} \arcsin\left(2 * \frac{z}{w}\right)$$

Since
$$X = W\cos\phi$$

then
$$Q = Z + L\sin\phi$$

$$L = \frac{(Q - Z)}{\sin\phi}$$

determining the height of the object from the height scanning drum; and calculating the volume of the object.

* * * * *